United States Patent Office 3,732,254
Patented May 8, 1973

3,732,254
SESAMOLYL AND PIPERONYL ETHERS AND THIOETHERS
John B. Siddall, Palo Alto, Calif., assignor to Zoecon Corporation, Palo Alto, Calif.
No Drawing. Filed Feb. 25, 1971, Ser. No. 119,041
Int. Cl. C07d 13/10
U.S. Cl. 260—340.5                              11 Claims

ABSTRACT OF THE DISCLOSURE

Novel phenyl derivatives of Formula I formed by mercuric salt addition of water or alcohol useful for control of insects.

---

This invention relates to novel phenyl derivatives of Formula I

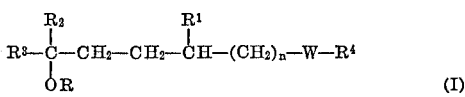

(I)

wherein, $n$ is the positive integer one or two;
each of $R^1, R^2, R^3$ is lower alkyl;
W is oxygen atom, sulfur atom, sulfinyl or sulfonyl;
R is hydrogen, carboxylic acyl, lower alkyl, cycloalkyl or aralkyl; and
$R^4$ is one of the groups

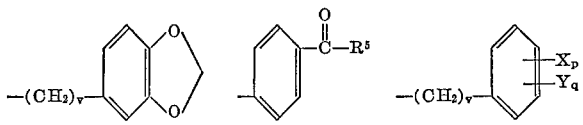

in which $v$ is zero or the positive integer one; $R^5$ is hydrogen, lower alkyl, cycloalkyl, aralkyl or lower alkoxy; X is halo, Y is lower alkyl, lower alkenyl, lower alkoxy, nitro, cyano, halomethyl, dihalomethyl, trihalomethyl, lower alkylthio, lower alkylsulfinyl or lower alkylsulfonyl; $p$ is zero or a positive integer of one to five; and $q$ is zero or a positive integer of one to three, the sum of $p$ and $q$ being from one to five.

The novel compounds of Formula I are useful for the control of insects. The utility of these compounds as insect control agents is believed to be attributable to their juvenile hormone activity. They are preferably applied to the immature insect, namely—during the embryo, larvae or pupae stage in view of their ability to effect metamorphosis and otherwise cause abnormal development. These compounds are effective control agents for Hemipteran such as Lygaeidae, Miridae and Pyrrhocoridae; Coleopteran such as Tenebrionidae; Lipidopteran such as Pyralidae, Noctuidae and Gelechiidae; Dipteran such as mosquitoes; Orthoptera such as roaches; and Homoptera such as aphids. The compounds be applied at low dosage levels of the order of 0.001 μg. to 25 μg. per insect. Suitable carrier substances include liquid or solid carriers, such as water, mineral or vegetable oils, talc, silica and natural or synthetic resin. The control of insects in accordance with the present invention is accomplished by spraying, dusting or exposing the insects to the vapor of the novel compounds. Generally, a concentration of less than 75% of the active compound is employed. The formulation can include insect attractants, emulsifying agents and wetting agents to assist in the application and efficiency of the active ingredient.

In the description hereinafter, each of R—$R^5$, W, $v$, X and Y is as defined hereinabove.

The compounds of Formula I are prepared from the olefin precursor of Fomula II (W' is oxygen atom or sulfur atom);

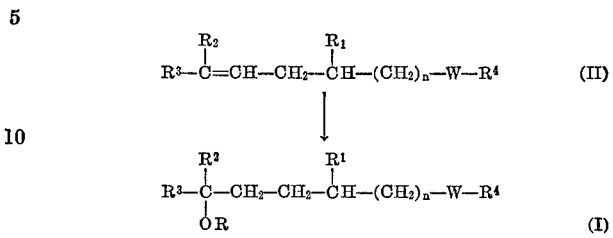

using mercuric salt followed by reduction of the oxymercurial intermediate in situ. Thus, an olefin of Formula II is reacted with, for example, mercuric acetate in aqueous ether followed by reduction of the oxy-mercurial intermediate in situ. Suitable mercuric salts include mercuric acetate, mecuric nitrate, mercuric trifluoroacetate, mercuric acylates and mercuric halides. Suitable reducing agents include the borohydrides, hydrazine and sodium amalgam. See Brown and Rei, J. Am. Chem. Soc. 91, 5646 (1969); Brown et al., J. Am. Chem. Soc. 89, 1522 and 1524 (1967); and Wakabayashi, J Med. Chem. 12, 191 (January 1969). By conducting the reaction in the presence of an alcohol (R—OH) such as methanol, ethanol, isopropyl alcohol, benzyl alcohol, cyclopentanol, and the like, the corresponding ether is prepared. The compounds of Formula I, wherein R is carboxylic acyl, are prepared from a compound of Formula I, wherein R is hydrogen, by reaction with a carboxylic acid chloride or bromide or carboxylic acid anhydride in pyridine or by treatment with a carboxylic acid anhydride in the presence of sodium acetate. The reaction is generally conducted at about room temperature to reflux temperature for about one to forty-eight hours, shorter reaction time being favored by temperatures above room temperature.

The sulfinyl compounds (W is SO) are prepared by treatment of a thioether with sodium metaperiodate, hydrogen peroxide, or the like, at a temperature of from about 0° to 20° C. for about one to six hours. The reaction usually affords some of the sulfonyl compound also which can be separated by chromatography. By using more than one mole of sodium periodate or hydrogen peroxide, higher temperature and longer reaction time, the reaction favors formation of the sulfonyl compounds. Preparation of sulfinyl and sulfonyl compounds is described by N. J. Leonard et al., Journal of Organic Chemistry 27, 282 (1962).

The term "halo," as used herein, refers to bromo, chloro, fluoro or iodo. The term "lower alkyl," as used herein, refers to an alkyl group, straight or branched, having a chain length of one to six carbon atoms. The term "cycloalkyl," as used herein, refers to a cycloalkyl of four to eight carbon atoms. The term "aralkyl," as used herein, refers to aralkyl of seven to twelve carbon atoms, such as benzyl, phenethyl, methylbenzyl or naphthyl methyl. The term "carboxylic acyl," as used herein, refers to the acyl group of a carboxylic acid, anhydride or halide. The acyl group is determined by the particular carboxylic acid halide or carboxylic acid anhydride employed in the esterification of a compound of Formula I where R is hydrogen. Although no upper limitation need be placed on the number of carbon atoms contained in the acyl group within the scope of the present invention, generally it contains from one to eighteen carbon atoms. Typical esters of the present invention include formate, acetate, propionate, enanthate, benzoate, trimethylacetate, trichloracetate, trifluoroacetate, t-butylacetate, phenoxyacetate, cyclopentylpropionate, aminoacetate, β-chloropropionate, adamantoate, octadec-9-enoate, dichloroacetate, butyrate, pentanoate, hexanoate, phenylacetate, p-methylbenzoate, β-phenylpropionate, 3,4-dimethylbenzoate, p-isopropylbenzoate, cyclohexylacetate, stearate, methacrylate, p-chloromethylbenzoate, p-methoxybenzoate and p-nitrobenzoate.

The compounds of Formula I include lower alkyl and lower alkoxy substituted phenyl, i.e. wherein Y is lower alkyl or lower alkoxy, which are exemplified by 4-ethylphenyl,
3-ethylphenyl,
2-ethylphenyl,
3,5-dimethylphenyl,
3,4-dimethylphenyl,
2,6-dimethylphenyl,
2,5-dimethylphenyl,
2,4-dimethylphenyl,
2,3-dimethylphenyl,
2,6-dimethylphenyl diisopropylphenyl,
3,5-di-t-butylphenyl,
2,6-di-sec-butylphenyl,
2,5-di-t-butylphenyl,
2,4-di-t-butylphenyl,
2,6-di-t-butyl-4-methylphenyl,
4-t-butylphenyl,
3-t-butylphenyl,
4-sec-butylphenyl,
2-t-butylphenyl,
2-sec-butylphenyl,
4-t-butyl-2-methylphenyl,
2-t-butyl-6-methylphenyl,
2-t-butyl-5-methylphenyl,
2-t-butyl-4-methylphenyl,
4-t-amylphenyl,
2-isopropylphenyl,
3-isopropylphenyl,
2-n-propylphenyl,
4-n-propylphenyl,
2,3,5,6-tetramethylphenyl,
2,4,6-tri-t-butylphenyl,
2,3,5-trimethylphenyl,
2,3,6-trimethylphenyl,
2,4,6-trimethylphenyl,
3,4,5-trimethylphenyl,
4-isopropylphenyl,
2-methyl-4,6-dinitrophenyl,
2-methyl-4-chlorophenyl,
2-chloro-4-t-butylphenyl,
2-chloro-4,5-dimethylphenyl,
2,6-dimethyl-4-nitrosophenyl,
2,6-dimethyl-4-nitrophenyl,
2,6-dimethyl-4-nitrophenyl,
2,4-dichloro-6-methylphenyl,
2,4-dichloro-5-methylphenyl,
2,6-di-t-butyl-4-nitrosophenyl,
2,6-dibromo-4-methylphenyl,
4-chloro-2,3,6-trimethylphenyl,
4-chloro-3-methylphenyl,
4-chloro-2-methylphenyl,
2-chloro-6-methylphenyl,
4-chloro-3,5-dimethylphenyl,
4-chloro-2,6-dimethylphenyl,
4-chloro-2,5-dimethylphenyl,
2-chloro-4,5-dimethylphenyl,
4-t-butyl-2-chloro-phenyl,
2-bromo-4-methylphenyl,
4-bromo-3,5-dimethylphenyl,
2-bromo-4,5-dimethylphenyl,
2-methyl-3-nitrophenyl,
3-methyl-4-nitrophenyl,
4-methyl-3-nitrophenyl,
5-methyl-2-nitrophenyl,
2-methyl-4-nitrosophenyl,
3-methyl-4-nitrosophenyl and
2-methoxy-4-methylphenyl and lower alkoxyphenyl, such as 3,5-dimethoxyphenyl,
2,6-dimethoxyphenyl,
2,3-dimethoxyphenyl,
4-n-butoxyphenyl,
4-methoxyphenyl,
4-ethoxyphenyl,
2-ethoxy-4-nitrophenyl,
2-methoxy-4-nitrophenyl,
2-methoxy-4-chlorophenyl and
3-methoxyphenyl.

Examples of other phenyl groups ($R^4$) are
4-nitrosophenyl,
2-chloro-4-nitrosophenyl,
2-chloromethyl-4-nitrophenyl,
3-trifluoromethyl-2,4,6-trinitrophenyl,
4-cyanophenyl,
3-cyanophenyl,
2-cyanophenyl,
4-methylthiophenyl,
4-trifluoromethylphenyl,
3-trifluoromethylphenyl,
2,5-dichloro-4-methoxyphenyl,
2,6-dichloro-4-(methylsulfonyl)phenyl,
3,5-dichloro-4-(methylsulfonyl)phenyl, and
dichloro-4-methylthiophenyl.

Examples of other phenyl groups ($R^4$) of the compounds of the present invention are 2-chloro-4-bromophenyl, 2,3 or 4-chlorophenyl, 2,3-, 2,4-, 2,5-, 2,6-, 3,4-, or 3,5-dichlorophenyl, 2,3,4-, 2,3,6-, 2,3,5-, 2,4,5-, 2,4,6- or 3,4,5-trichlorophenyl, pentachlorophenyl, pentabromophenyl, pentafluorophenyl, 2,3,4,6-tetrachlorophenyl, 2,3,-5,6-tetrafluorophenyl, 2,4,6-tribromophenyl, 2,4,6-triiodophenyl, 4-bromo-2,6-dichlorophenyl, 4-iodophenyl, 2-, 3- or 4-fluorophenyl, 2-, 3- or 4-bromophenyl and 4-iodophenyl.

The following examples are provided to illustrate the present invention. Temperature is given in degrees centigrade.

EXAMPLE 1

(A) 2,5-dimethylhex-4-en-1-ol (2.6 g.) is dissolved in 40 ml. of ether, cooled to −50° and 2.44 g. of phosphorus tribromide in 5 ml. of ether is added over 20 minutes. The reaction mixture is stirred for two hours, poured onto ice and extracted with ether. The ethereal extracts are combined, washed with 10% sodium carbonate, water and saturated sodium chloride, dried over sodium sulfate and the solvent concentrated to yield 2,5-dimethylhex-4-enyl bromide.

(B) To a suspension of 1 g. of sodium hydride (washed with pentane) in 10 ml. of tetrahydrofuran, under argon, and cooled to 4°, is added 3.38 g. of p-ethylphenol in 15 ml. of tetrahydrofuran over one hour. The reaction mixture is stirred for about 16 hours.

To the above-prepared sodium salt solution of p-ethylphenol, cooled in an ice-bath, is added with ether, the concentrate of the bromide from Part A over 1.5 hours. After 1.75 hours, the reaction is warmed to room temperature and allowed to stand about 16 hours. The reaction is poured into water and extracted with ether. The ethereal extracts are combined, washed with 10% NaOH, water and saturated sodium chloride, dried over sodium sulfate and solvents evaporated to yield 1-(2′,5′-dimethylhex-4′-enyloxy) - 4 - ethylbenzene(2,5 - dimethylhex-4-enyl p-ethylphenyl ether).

(C) The procedure of Part A is repeated with the exception of using an equal amount of the C-1 alcohols listed in column I to afford the corresponding C–1 bromide listed in column II.

I 2,5-dimethylhept-4-en-1-ol
2-methyl-5-ethylhept-4-en-1-ol
2,5-diethylhept-4-en-1-ol
2,5-dimethyloct-4-en-1-ol

II 2,5-dimethylhept-4-enyl bromide
2-methyl-5-ethylhept-4-enyl bromide
2,5-diethylhept-4-enyl bromide
2,5-dimethyloct-4-enyl bromide The C–1 chlorides are prepared in the same way using phosphorus trichloride in place of phosphorus tribromide.

Following the procedure of Part B, each of the bromides under column II is reacted with p-ethylphenol to prepare the p-ethylphenyl ethers under column III.

III 2,5-dimethylhept-4-enyl p-ethylphenyl ether
2-methyl-5-ethylhept-4-enyl p-ethylphenyl ether
2,5-diethylhept-4-enyl p-ethylphenyl ether
2,5-dimethyloct-4-enyl p-ethylphenyl ether (D) To a mixture of 1.9 g. of mercuric acetate, 6 ml. of water and 20 ml. of tetrahydrofuran is added 0.9 g. of 2,5-dimethylhex-4-enyl p-ethylphenyl ether slowly. After addition is complete, the reaction mixture is stirred for about 20 minutes. The mixture is cooled to about 0° and 6 ml. of aqueous sodium hydroxide (3 molar) is added followed by 0.49 g. of sodium borohydride in aqueous sodium hydroxide (about 3 molar). The mixture is stirred for about 30 minutes. The mixture is then decanted, concentrated, diluted with water and then extracted with ether. The ethereal extract is washed with water, dried over magnesium sulfate and the product chromatographed on silica to yield 5-hydroxy - 2,5 - dimethylhexyl p-ethylphenyl ether (I, $R^1=R^2=R^3=$methyl, R=hydrogen, W is oxygen atom; $R^4$ is p-ethylphenyl).

The above process is repeated with the exception of using the ethers listed in column III as the starting material to yield the corresponding hydroxy substituted ether under column IV, that is:

IV 5-hydroxy-2,5-dimethylheptanyl p-ethylphenyl ether
5-hydroxy-2-methyl-5-ethylheptanyl p-ethylphenyl ether
5-hydroxy-2,5-diethylheptanyl p-ethylphenyl ether
5-hydroxy-2,5-dimethyloctanyl p-ethylphenyl ether

EXAMPLE 2

A mixture of 1 g. of 5-hydroxy-2,5-dimethylhexyl p-ethylphenyl ether, 10 ml. of acetic anhydride and 0.5 g. of dry sodium acetate is reflux for about five hours. After cooling, excess anhydride is removed by vacuum and the residue extracted with ether. The ethereal extract is washed, dried over magnesium sulfate and evaporated to yield 5-acetoxy-2,5-dimethylhexyl p-ethylphenyl ether.

The acetate of each of the hydroxyl compounds under column IV are prepared using the above procedure, that is 5-acetoxy-2,5-dimethylheptanyl p-ethylphenyl ether
5-acetoxy-2-methyl-5-ethylheptanyl p-ethylphenyl ether
5-acetoxy-2,5-diethylheptanyl p-ethylphenyl ether
5-acetoxy-2,5-dimethyloctanyl p-ethylphenyl ether

EXAMPLE 3

A mixture of 2 g. of dry 5-hydroxy - 2,5 - dimethylhexyl p-ethylphenyl ether, 15 ml. of acetyl chloride and 20 ml. of dry pyridine under nitrogen is heated on a steam bath for about six hours. After cooling, the mixture is concentrated under vacuum and the residue taken up in ether. The ethereal extract is washed, dried over magnesium sulfate and evaporated to yield the corresponding acetate (5-acetoxy - 2,5 - dimethylhexyl p-ethylphenyl ether).

The process of this example is repeated with the exception of using triethylamine in place of pyridine to yield 5-acetoxy-2,5-dimethylhexyl p-ethylphenyl ether.

By use of the foregoing procedure, each of 5-hydroxy-2,5-dimethylheptanyl p-ethylphenyl ether and 5-hydroxy-2,5-dimethyloctanyl p-ethylphenyl ether is converted into the corresponding 5-chloroacetate, 5-dichloroacetate and 5-trichloroacetate using chloroacetyl chloride, dichloroacetyl chloride and tirchloroacetyl chloride.

EXAMPLE 4

A mixture of 20 ml. of dry formic acid and 2 g. of 2,5-dimethylhexyl-4-enyl p-ethylphenyl ether is heated at 50° for two hours and then poured onto ice cold potassium bicarbonate solution. The reaction is worked up by the extraction with ether, washing the ethereal extract, drying over magnesium sulfate and evaporation to yield the formate of 5-hydroxy-2,5-dimethylhexyl p-ethylphenyl ether.

Using the above process, the formates of Formula I are prepared from the corresponding precursor of Formula II, having an olefinic bond in the terminal group.

EXAMPLE 5

(A) Each of p-nitrophenol, p-chlorophenol, 2,3,4-trichlorophenol, 3-ethylphenol, p-t-butyl phenol, p-trifluoromethylphenol, p-ethoxyphenol, 3-ethyl - 4 - chlorophenol, 2-methyl - 4 - ethylphenol, 2-chloro-4-t-butylphenol, 2-chloro - 4,5 - dimethylphenol, p-allylphenol, p-(1'-propenyl) phenol, p-sec. butylphenol, 3,4-methylenedioxyphenol, 3-chloro - 4 - ethylphenol, 2,4,6-trichlorophenol, 3,4 - dichlorophenol, 2,4 - dichlorophenol, 2,4,6-trichlorophenol, 2,3,4,6-tetrachlorophenol p-methylphenol and p-isopropylphenol is alkylated using 2,5-dimethylhex-4-enyl bromide according to the process of Example 1(B) to prepare the respective ether under column V, i.e.

V 2,5-dimethylhex-4-enyl p-nitrophenyl ether
2,5-dimethylhex-4-enyl p-chlorophenyl ether
2,5-dimethylhex-4-enyl 2,3,4-trichlorophenyl ether
2,5-dimethylhex-4-enyl 3-ethylphenyl ether
2,5-dimethylhex-4-enyl p-t-butylphenyl ether
2,5-dimethylhex-4-enyl p-trifluoromethylphenyl ether
2,5-dimethylhex-4-enyl p-ethoxyphenyl ether
2,5-dimethylhex-4-enyl 3-ethyl-4-chlorophenyl ether
2,5-dimethylhex-4-enyl 2-methyl-4-ethylphenyl ether
2,5-dimethylhex-4-enyl 2-chloro-4-t-butylphenyl ether
2,5-dimethylhex-4-enyl 2-chloro-4,5-dimethylphenyl ether
2,5-dimethylhex-4-enyl p-allylphenyl ether
2,5-dimethylhex-4-enyl p-(1'-propenyl) phenyl ether
2,5-dimethylhex-4-enyl p-sec. butylphenyl ether
2,5-dimethylhex-4-enyl 3,4-methylenedioxyphenyl ether
2,5-dimethylhex-4-enyl 3-chloro-4-ethylphenyl ether
2,5-dimethylhex-4-enyl 2,4,6-trichlorophenyl ether
2,5-dimethylhex-4-enyl 3,4-dichlorophenyl ether
2,5-dimethylhex-4-enyl 2,4-dichlorophenyl ether
2,5-dimethylhex-4-enyl 2,4,5-trichlorophenyl ether
2,5-dimethylhex-4-enyl 2,3,4,6-tetrachlorophenyl ether
2,5-dimethylhex-4-enyl p-methylphenyl ether
2,5-dimethylhex-4-enyl p-isopropylphenyl ether In the same way, each of the bromides under column II is used as the alkylating agent in the procedure of Example 1(B) with the phenols of Part A of this example to prepare the respective substituted phenyl ethers of Formula II.

(B) The process of Example 1(D) is repeated using each of the substituted phenyl ethers under column V to prepare the respective hydroxyl under column VI.

VI 5-hydroxy-2,5-dimethylhexyl p-nitrophenyl ether
5-hydroxy-2,5-dimethylhexyl p-chlorophenyl ether
5-hydroxy-2,5-dimethylhexyl 2,3,4-trichlorophenyl ether
5-hydroxy-2,5-dimethylhexyl 3-ethylphenyl ether
5-hydroxy-2,5-dimethylhexyl p-t-butylphenyl ether
5-hydroxy-2,5-dimethylhexyl p-trifluoromethylphenyl ether
5-hydroxy-2,5-dimethylhexyl p-ethoxyphenyl ether
5-hydroxy-2,5-dimethylhexyl 3-ethyl-4-chlorophenyl ether
5-hydroxy-2,5-dimethylhexyl 2-methyl-4-ethylphenyl ether
5-hydroxy-2,5-dimethylhexyl 2-chloro-4-t-butylphenyl ether
5-hydroxy-2,5-dimethylhexyl 2-chloro-4,5-dimethylphenyl ether
5-hydroxy-2,5-dimethylhexyl p-allylphenyl ether
5-hydroxy-2,5-dimethylhexyl p-(1'-propenyl)phenyl ether
5-hydroxy-2,5-dimethylhexyl p-sec. butylphenyl ether
5-hydroxy-2,5-dimethylhexyl 3,4-methylenedioxyphenyl ether
5-hydroxy-2,5-dimethylhexyl 3-chloro-4-ethylphenyl ether
5-hydroxy-2,5-dimethylhexyl 2,4,6-trichlorophenyl ether
5-hydroxy-2,5-dimethylhexyl 3,4-dichlorophenyl ether
5-hydroxy-2,5-dimethylhexyl 2,4-dichlorophenyl ether
5-hydroxy-2,5-dimethylhexyl 2,4,5-trichlorophenyl ether
5-hydroxy-2,5-dimethylhexyl 2,3,4,6-tetrachlorophenyl ether
5-hydroxy-2,5-dimethylhexyl p-methylphenyl ether
5-hydroxy-2,5-dimethylhexyl p-isopropylphenyl ether By use of the procedure of Example 2 or 3, each of the 5-hydroxy-2,5-dimethylhexyl substituted phenyl ethers under column VI is converted into the respective 5-acylate, e.g. 5-acetate, 5-formate, etc.

EXAMPLE 6

(A) 20 grams of 2,5-dimethylhex-4-en-1-ol is dissolved in 50 ml. of pyridine and 20 ml. of acetic anhydride and left at room temperature for about 48 hours. Then the mixture is extracted with ether and the ethereal extracts washed with water, 10% aqueous HCl and brine to yield 1-acetoxy-2,5-dimethylhex-4-ene.

(B) 15 grams of mercuric acetate in 50 ml. of dry ethanol is added to 10 g. of 1-acetoxy-2,5-dimethylhex-4-ene in 30 ml. of dry ethanol cooled in an ice bath. The temperature is allowed to come to room temperature by standing overnight. Then the mixture is cooled to 0°, 10 g. of potassium hydroxide in 150 ml. of ethanol is added followed by addition of 1 g. of sodium borohydride in small portions. After about 30 minutes at 0°, water (about 100 ml.) is added and the mixture left at room temperature for two hours. The mixture is filtered, filtrate concentrated and extracted with ether. The ethereal extract is washed, dried and evaporated to yield 5-ethoxy-2,5-dimethylhexan-1-ol which is purified by distillation or chromatography.

(C) To 10 g. of 5-ethoxy-2,5-dimethylhexan-1-ol in 250 ml. of methylene chloride and 10 ml. of triethylamine at —5° to 0° is added slowly 6.5 ml. of mesyl chloride. About 15 minutes after addition is complete, the reaction is worked up by pouring onto ice, added more methylene dichloride, extracted with ice water, washed with 10% HCl, saturated sodium bicarbonate, brine and dried to yield the 1-mesylate which can be purified by chromatography. Cf. Crossland et al., J. Org. Chem. 35, No. 9 3195 (1970).

(D) A mixture of 1.4 g. of p-ethylphenol and 2.8 g. of potassium carbonate in 50 ml. of dimethylformamide is stirred at 100° under nitrogen for about 15 minutes. Three g. of the mesylate of Part C is added and the mixture heated at 100° for about three hours. The reaction is allowed to cool and then worked up by extraction with ether and washing with dilute sodium hydroxide and brine to yield 5-ethoxy-2,5-dimethylhexyl p-ethylphenyl ether which can be purified by chromatography eluting with ethyl acetate; hexane.

EXAMPLE 7

Following the processes of Example 6, Parts A and B, each of the alcohols under column I is converted into the respective acetate and then into the 5-ethoxy derivative under column VII:

VII 5-ethoxy-2,5-dimethylheptan-1-ol
5-ethoxy-2-methyl-5-ethylheptan-1-ol
5-ethoxy-2,5-diethylheptan-1-ol
5-ethoxy-2,5-dimethyloctan-1-ol Similarly, using methanol in place of ethanol in the process of Example 6(B), there is prepared the methoxy derivatives under column VIII:

VIII 5-methoxy-2,5 dimethylhexan-1-ol
5-methoxy-2,5-dimethylheptan-1-ol
5-methoxy-2-methyl-5-ethylheptan-1-ol
5-methoxy-2,5-diethylheptan-1-ol
5-methoxy-2,5-dimethyloctan-1-ol The alcohol of Part B, Example 6 and each of the alcohols under columns VII and VIII is treated with phosphorus tribromide following the procedure of Example 1(A) to prepare the respective bromide under column IX.

IX 5-ethoxy-2,5-dimethylhexyl bromide
5-ethoxy-2,5-dimethylheptyl bromide
5-ethoxy-2-methyl-5-ethylheptyl bromide
5-ethoxy-2,5-diethylhexptyl bromide
5-ethoxy-2,5-dimethyloctyl bromide
5-methoxy-2,5-dimethylhexyl bromide
5-methoxy-2,5-dimethylheptyl bromide
5-methoxy-2,5-dimethylheptyl bromide
5-methoxy-2-methyl-5-ethylheptyl bromide
5-methoxy-2,5-dimethyloctyl bromide
5-methoxy-2,5-diethylheptyl bromide Each of the alcohols under columns VII and VIII is converted into the respective mesylate and then reacted with p-ethylphenol according the procedure of Example 6, Parts C and D to produce the phenyl ethers under column X. Alternatively, the phenyl ethers under column X are prepared by alkylation of p-ethylphenol using the bromides under column IX according to the procedure of Example 1(B).

X 5-ethoxy-2,5-dimethylheptyl p-ethylphenyl ether
5-ethoxy-2-methyl-5-ethylheptyl p-ethylphenyl ether
5-ethoxy-2,5-diethylheptyl p-ethylphenyl ether
5-ethoxy-2,5-dimethyloctyl p-ethylphenyl ether
5-methoxy-2,5-dimethylhexyl p-ethylphenyl ether
5-methoxy-2,5-dimethylheptyl p-ethylphenyl ether
5-methoxy-2,5-diethylheptyl p-ethylphenyl ether
5-methoxy-2,5-dimethyloctyl p-ethylphenyl ether

EXAMPLE 8

(A) To a solution of 1.9 g. of 2,5-dimethylhex-4-enyl p-ethylphenyl ether in 20 ml. of ethanol, cooled to 0° by an ice bath, is added a suspension of 2.3 g. of mercuric acetate in 50 ml. of ethanol over about 15 minutes. The reaction mixture is stirred for two hours and then with cooling, 1.2 g. of potassium hydroxide in 20 ml. of ethanol is added. Then 0.14 g. of sodium borohydride is added in small portions and stirring continued about 30 minutes. The solution is decanted, then concentrated to about half volume, diluted with 100 ml. of water and extracted with ether. The ethereal phase is washed with water, dried over magnesium sulfate, and the crude product chromatographed on silica to yield 5-ethoxy-2,5-dimethylhexyl p-ethylphenyl ether.

(B) The process of Part A is repeated using each of methanol, n-propanol, isopropanol, n-butanol, sec-butanol, benzyl alcohol, cyclopentanol and n-hexanol in place of ethanol to prepare the respective ether, that is:

5-methoxy-2,5-dimethylhexyl p-ethylphenyl ether
5-n-propoxy-2,5-dimethylhexyl p-ethylphenyl ether
5-isopropoxy-2,5-dimethylhexyl p-ethylphenyl ether
5-n-butoxy-2,5-dimethylhexyl p-ethylphenyl ether
5-sec.-butoxy-2,5-dimethylhexyl p-ethylphenyl ether
5-benzyloxy-2,5-dimethylhexyl p-ethylphenyl ether
5-cyclopentyloxy-2,5-dimethylhexyl p-ethylphenyl ether
5-n-hexyloxy-2,5-dimethylhexyl p-ethylphenyl ether

EXAMPLE 9

(A) Following the procedure of Examples 6(A) and (B), each of 3,6-dimethylhept-5-en-1-ol, 3,6-dimethyloct-5-en-1-ol, 3-methyl-6-ethyloct-5-en-1-ol, 3,6-diethyloct-5-en-1-ol and 3,6-dimethylnon-5-en-1-ol is first converted into the corresponding acetate and then ethanol added to prepare the respective compound under column XI:

XI 6-ethoxy-3,6-dimethylheptan-1-ol
6-ethoxy-3,6-dimethyloctan-1-ol
6-ethoxy-3-methyl-6-ethyloctan-1-ol
6-ethoxy-3,6-diethyloctan-1-ol
6-ethoxy-3,6-dimethylnonan-1-ol Similarly, the addition of methanol yields the respective 6-methoxy compounds, i.e. 6-methoxy-3,6-dimethylheptan-1-ol, etc.

(B) Following the procedure of Examples 6(C) and (D), each of the ethoxy compounds under column XI is converted into the corresponding mesylate which is then reacted with p-ethylphenol to prepare:

6-ethoxy-3,6-dimethylheptyl p-ethylphenyl ether
6-ethoxy-3,6-dimethyloctyl p-ethylphenyl ether
6-ethoxy-3-methyl-6-ethyloctyl p-ethylphenyl ether
6-ethoxy-3,6-diethyloctyl p-ethylphenyl ether
6-ethoxy-3,6-dimethylnonyl p-ethylphenyl ether In the same way, the corresponding methoxy compounds are prepared, i.e. 6-methoxy-3,6-dimethylheptyl p-ethylphenyl, ether, etc.

EXAMPLE 10

Following the process of either Example 1 or 6,6-ethoxy-3,6-dimethylheptyl bromide or the mesylate of 6-ethoxy-3,6-dimethylheptan-1-ol is reacted with each of 4-methylsulfonylphenol, 2,4 - dimethylthiophenol, 4-ethylthiophenol, 4-methylthio-3-ethylphenol, 4-methylthio-3,5-dimethylphenol, 4 - methylthiomethylphenol, 2 - allyl-4-chlorophenol, 4-s-butenylphenol, 4 - (1-propenyl)phenol, 4-allylphenol, 4-cyanophenol, 2-allyl-3,5-dichlorophenol, 4-methylthiophenol and 2-allyl-6-methoxyphenol to prepare the respective ether, i.e., 6-ethoxy-3,6-dimethylheptyl 4-methylsulfonylphenyl ether,
6-ethoxy-3,6-dimethylheptyl 2,4-dimethylthiophenyl ether,
6-ethoxy-3,6-dimethylheptyl 4-ethylthiophenyl ether,
6-ethoxy-3,6-dimethylheptyl 4-methylthio-3-ethylphenyl ether,
6-ethoxy-3,6-dimethylheptyl 4-methylene-3,5-dimethylphenyl ether,
6-ethoxy-3,6-dimethylheptyl 4-methylthiomethylphenyl ether,
6-ethoxy-3,6-dimethylheptyl 2-allyl-4-chlorophenyl ether,
6-ethoxy-3,6-dimethylheptyl 4-s-butylphenyl ether,
6-ethoxy-2,6-dimethylheptyl 4-(1-propenyl) phenyl ether,
6-ethoxy-3,6-dimethylheptyl 4-allylphenyl ether,
6-ethoxy-3,6-dimethylheptyl 4-cyanophenyl ether,
6-ethoxy-3,6-dimethylheptyl 2-allyl-3,5-dichlorophenyl ether,
6-ethoxy-3,6-dimethylheptyl 4-methylthiophenyl ether,
6-ethoxy-3,6-dimethylheptyl 2-allyl-6-methoxyphenyl ether.

In the same way, each of the 6-ethoxy and 6-methoxy compounds of Examples 6 and 9 is reacted with the above phenols to prepare the respective substituted phenyl ether, e.g., 6-methoxy-3,6-dimethylheptyl p-methylthiophenyl ether,
6-methoxy-3,6-dimethylheptyl p-allylphenyl ether, etc.

EXAMPLE 11

Following the process of Example 1, each of the unsaturated alcohols of Example 9(A) is reacted with p-ethylphenol to prepare the respective phenyl ether, i.e., 3,6-dimethylhept-5-enyl p-ethylphenyl ether,
3,6-dimethyloct-5-enyl p-ethylphenyl ether,
3-methyl-6-ethyloct-5-enyl p-ethylphenyl ether,
3,6-diethyloct-5-enyl-p-ethylphenyl ether,
3,6-dimethylnon-5-enyl p-ethylphenyl ether.

Using the process of Example 1(D), each of the phenyl ethers is converted into the respective 6-hydroxy, i.e., 6-hydroxy-3,6-dimethylheptyl p-ethylphenyl ether,
6-hydroxy-3,6-dimethyloctyl p-ethylphenyl ether,
6-hydroxy 3-methyl-6-ethyloctyl p-ethylphenyl ether,
6-hydroxy-3,6-dimethylheptyl p-ethylphenyl ether,
6-hydroxy-3,6-dimethylnonyl p-ethylphenyl ether.

By use of the process of either Example 2 or 3, esters of the 6-hydroxy compounds are prepared, e.g. 6-acetoxy-3,6-dimethylheptyl p-ethylphenyl ether, etc.

EXAMPLE 12

A mixture of 0.4 g. of sesamol, 0.4 g. of potassium carbonate, 0.55 g. of 6-methoxy-3,6-dimethylheptyl bromide and 20 ml. of acetone, under nitrogen, is stirred for about 16 hours. The mixture is then poured into water and extracted with ether. The ethereal extract is washed with cold 2 N sodium hydroxide, water and brine, dried over sodium sulfate and evaporated to yield 6-methoxy-3,6 - dimethoxyheptyl 3,4 - methylenedioxyphenyl ether which can be purified by chromatography.

Using the foregoing process, other compounds of Formula I wherein $R^4$ is 3,4-methylenedioxyphenyl are prepared.

EXAMPLE 13

To a solution of 2 g. of sodium in 50 ml. of ethanol at 0° is added 15 g. of p-ethylphenyl mercaptan. After about 0.5 hour, 20 g. of 6-ethoxy-3,6-dimethylheptyl bromide is added and then the mixture is refluxed for about two hours. The solvent is evaporated and the concentrate taken up in petroleum ether which is washed with water, dried over magnesium sulfate and evaporated under reduced pressure to yield p-ethylphenyl mercaptan 6-ethoxy-3,6-dimethylheptane 1-(4'-ethylphenyl) thio-6-ethoxy-3,6-dimethylheptane.

The above is repeated using 3,4-methylenedioxyphenylmercaptan to prepare 1-(3',4'-methylenedioxyphenyl) thio-6-ethoxy-3,6-dimethylheptane.

Each of the bromides under column II is reacted with p-ethylphenylmercaptan to prepare 1-(4-ethylphenyl) thio-2,5-dimethylhept-4-ene, 1-(4' - ethylphenyl)thio-2,5-diethylhept-4-ene, and 1-(4'-ethylphenyl)thio-2,5-dimethyloct-4-ene.

Following the procedure of this example, other thioethers of Formula I are prepared.

EXAMPLE 14

To 210 ml. of a 0.5 M solution of sodium metaperiodate (aqueous methanol 1/1) at 0° is added 0.1 mole of 1-(4'-ethylphenyl)thio-6-ethoxy - 3,6 - dimethylheptane. The mixture is stirred at 0° for four hours and then filtered to remove precipitated sodium iodate. The filtrate is diluted with water and then extracted with chloroform. The extract is dried over magnesium sulfate and solvent removed by evaporation to yield 6-ethoxy-3,6-dimethylheptyl p-ethylphenylsulfoxide which can be purified by chromatography on silica.

EXAMPLE 15

(A) To 200 ml. of aqueous methanol (1/1) containing 0.2 mole of sodium metaperiodate is added 0.1 mole of 1-(4'-ethylphenyl)thio-6-ethoxy - 3,6 - dimethylheptane. The mixture is maintained at about 30° for six hours. After cooling, the mixture is filtered to remove precipitated sodium iodate. The filtrate is diluted with water and then extracted with chloroform. The extract is dried over magnesium sulfate and solvent removed by evaporation to yield 6-ethoxy-3,6-dimethylheptyl p-ethylphenyl sulfone which can be purified by chromatography on silica.

Using the above process, other sulfides described herein are converted into the respective sulfonyl compounds.

(B) Three grams of methyl p-hydroxybenzoate and 4 g. of 5-ethoxy-2,5-dimethylhexyl bromide are added at 20° to methanolic sodium methoxide (0.5 g. of sodium and 7 ml. of methanol) and the mixture refluxed for four hours. After cooling to about 20°, the sodium bromide is filtered off and the filtrate concentrated. The concentrate is diluted with water and then extracted with ether. The ethereal extracts are combined, dried over sodium sulfate and evaporated under reduced pressure to yield methyl 4-(5-ethoxy-2,5-dimethylhexyloxy) benzoate which can be purified by chromatography on silica.

EXAMPLE 16

The precursors for preparation of the compounds of Formula I prepared according to the following outlined synthesis.

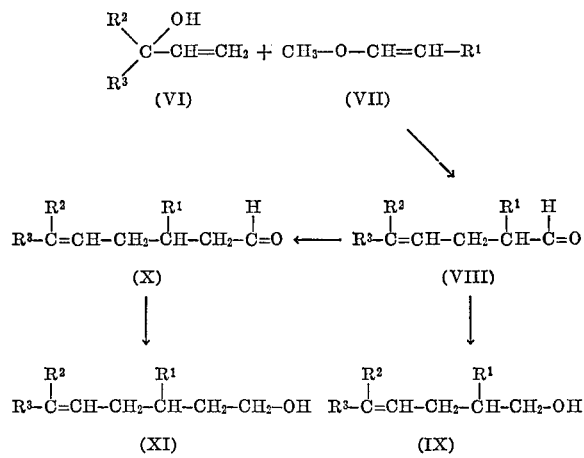

In the practice of the above outlined synthesis, an aldehyde of Formula VIII is prepared by the acid-catalyzed reaction of an allylic alcohol of Formula VI with an enol ether of Formula VII. An aldehyde of Formula VIII is then reduced using sodium borohydride to prepare the C-1 alcohol of Formula IX. An aldehyde of Formula X is prepared by ylid reaction using methoxymethyltriphenylphosphonium chloride and phenyl lithium on the aldehyde VIII. The alcohol of Formula XI is then prepared by reduction with sodium borohydride.

(A) A mixture of 44 g. of 3-methylbut-1-en-1-ol, 75 g. of 1-methoxyprop-1-ene and 0.26 g. of phosphoric acid is heated in a pressure vessel, under nitrogen, at about 140° for about one hour or until substantially all of the allylic alcohol is consumed as followed by chromatography. The mixture is allowed to cool and then about 1.5 ml. of triethylamine is added. The mixture is then distilled under vacuum to yield 2,5-dimethylhex-4-en-1-al.

(B) Five g. of 2,5-dimethylhex-4-en-1-al is added to a mixture of 2.2 g. of sodium borohydride, 100 ml. of methanol and 4 ml. of 2 N sodium hydroxide and the resulting mixture allowed to stand at room temperature for about three hours. The mixture is then poured into water and extracted with methylene chloride. The extracts are combined, washed, dried over magnesium sulfate and solvent evaporated to yield 2,5-dimethylhex-4-en-1-ol which can be purified by distillation.

(C) To a suspension of 21 grams of methoxymethyltriphenylphosphonium chloride in 200 ml. of absolute ether is added under nitrogen at room temperature a solution of 60 mmoles of phenyllithium in ether. After about 10 minutes, the mixture is cooled to —30° and 6 grams of 2,5-dimethylhex-4-en-1-al in either is added slowly. After about 15 hours at room temperature, the mixture is filtered and the filtrate evaporated to yield the methoxymethylene of 2,5-dimethylhex-4-en-al which is dissolved in aqueous tetrahydrofuran containing a small amount of dilute hydrochloric acid to yield 3,6-dimethylhept-5-en-1-al which is reduced using the process of Part B to yield 3,6-dimethylhept-5-en-1-ol.

(D) The process of Part A is repeated using each of 3-methylpent-1-en-3-ol, 3-ethylpent-1-en-3-ol and 3-methylhex-1-en-3-ol as the allylic alcohol to prepare 2,5-dimethylhept-4-en-1-al, 2-methyl-5-ethylhept-4-en-1-al and 2,5-dimethyloct-4-en-1-al, respectively. Using the process of Part B, each of the aldehydes is reduced to the respective C-1 alcohol.

By repeating the process of Part C using each of the thus-prepared aldehydes as the starting material, there is prepared 3,6 - dimethyloct-5-en-1-al, 3-methyl-6-ethyloct-5-en-1-al and 3,6 - dimetylnon-5-1-al. The respective alcohols are prepared by the process of Part B.

What is claimed is:

1. A compound selected from those of the formula:

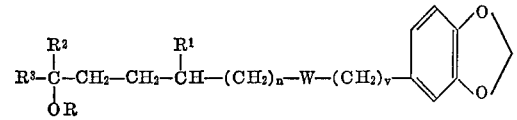

wherein, $n$ is the positive integer one or two;

$v$ is zero or the positive integer one;

each of $R^1$, $R^2$ and $R^3$ is lower alkyl;

W is oxygen atom, sulfur atom, sulfinyl or sulfonyl; and

R is hydrogen, carboxylic acyl of one to eighteen carbon atoms or lower alkyl.

2. A compound according to claim 1 wherein each of $R^1$, $R^2$ and $R^3$ is lower alkyl of one to three carbon atoms.

3. A compound according to claim 1 wherein each of $R^1$, $R^2$ and $R^3$ is methyl or ethyl.

4. A compound according to claim 1 of the formula

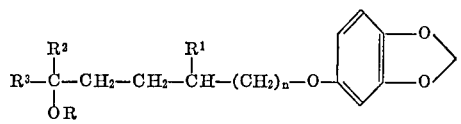

wherein each of $R^1$, $R^2$ and $R^3$ is methyl or ethyl.

5. A compound according to claim 4 wherein R is hydrogen.

6. A compound according to claim 6 wherein R is lower alkyl.

7. A compound according to claim 6 wherein R is lower alkyl of one to three carbon atoms.

8. A compound according to claim 4 wherein R is carboxylic acyl.

9. A compound according to claim 8 wherein R is acetyl.

10. A compound according to claim 4 wherein R is methyl.

11. A compound according to claim 4 wherein R is methyl; each of $R^1$, $R^2$ and $R^3$ is methyl; and $n$ is two.

References Cited
UNITED STATES PATENTS 3,563,982   2/1971   Bowers _____ 260—340.5 X ALEX MAZEL, Primary Examiner J. H. TURNIPSEED, Assistant Examiner U.S. Cl. X.R.

260—456 R, 456 P, 476 R, 473 A, 473 C, 473 R, 488 R, 590, 591, 592, 599, 600, 607 A, 607 C, 607 R, 609 E, 609 F, 609 R, 611 A, 612 D